(No Model.) 3 Sheets—Sheet 1.

G. J. MOELLER, Jr.
MACHINE FOR EXTERMINATING INSECTS.

No. 588,752. Patented Aug. 24, 1897.

(No Model.) 3 Sheets—Sheet 2.
G. J. MOELLER, Jr.
MACHINE FOR EXTERMINATING INSECTS.
No. 588,752. Patented Aug. 24, 1897.
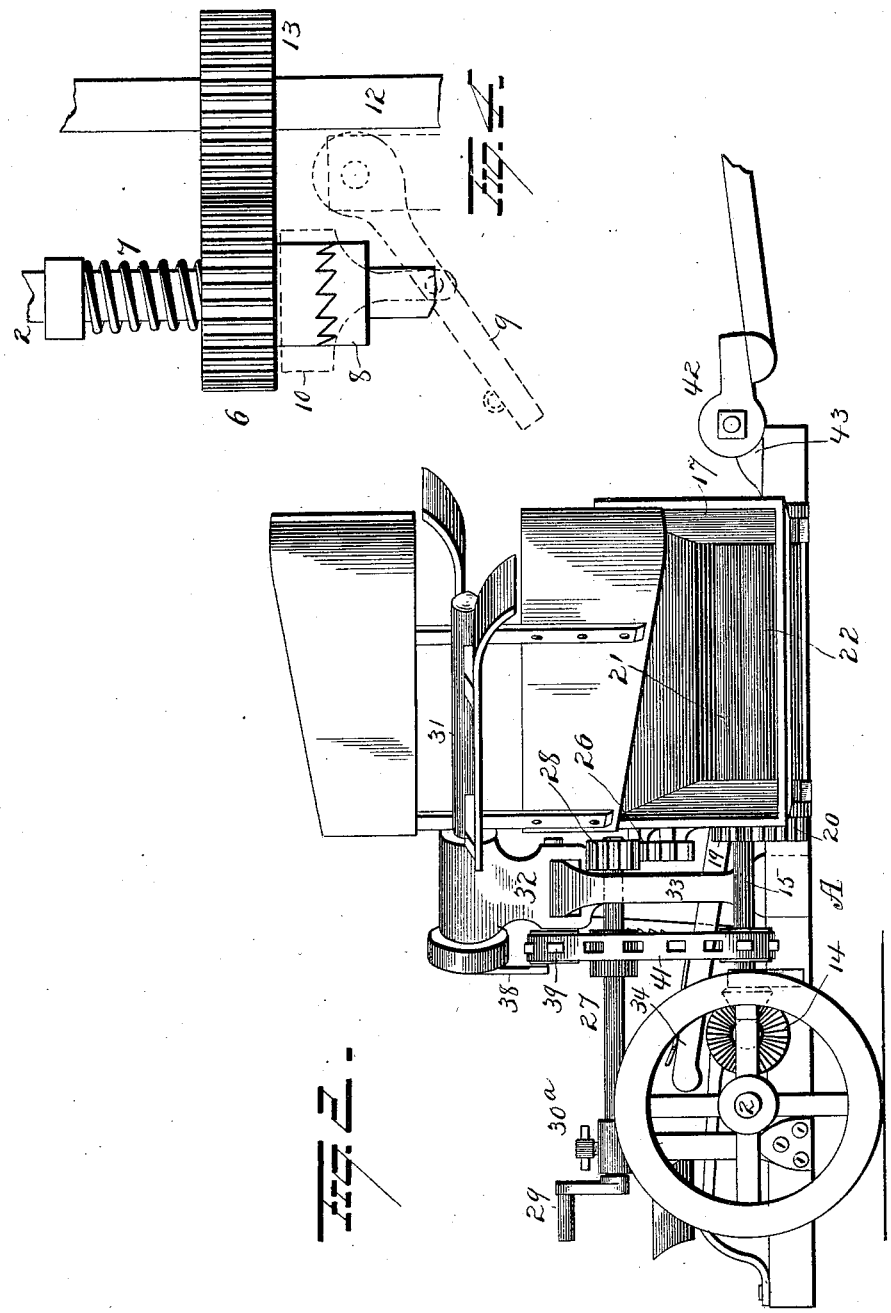

(No Model.) 3 Sheets—Sheet 3.

G. J. MOELLER, Jr.
MACHINE FOR EXTERMINATING INSECTS.

No. 588,752. Patented Aug. 24, 1897.

UNITED STATES PATENT OFFICE.

GEORGE J. MOELLER, JR., OF STRATMANN, MISSOURI.

MACHINE FOR EXTERMINATING INSECTS.

SPECIFICATION forming part of Letters Patent No. 588,752, dated August 24, 1897.

Application filed March 30, 1897. Serial No. 630,015. (No model.)

*To all whom it may concern:*

Be it known that I, GEORGE J. MOELLER, Jr., of Stratmann, in the county of St. Louis and State of Missouri, have invented certain new and useful Improvements in Machines for Exterminating Insects; and I do hereby declare the following to be a full, clear, and exact description of the invention, such as will enable others skilled in the art to which it appertains to make and use the same.

My invention relates to an improvement in machines for exterminating insects, the object being to provide mechanism for sweeping insects from potato or similar plants by machinery and disposing of them; and it consists in a hopper or hoppers, means for brushing the insects from the plants into the hopper as the machine moves along between rows of plants and means for exterminating the insects as fast as they are caught in the hoppers.

It further consists in certain novel features of construction and combinations of parts, which will be hereinafter described, and pointed out in the claims.

Figure 1:
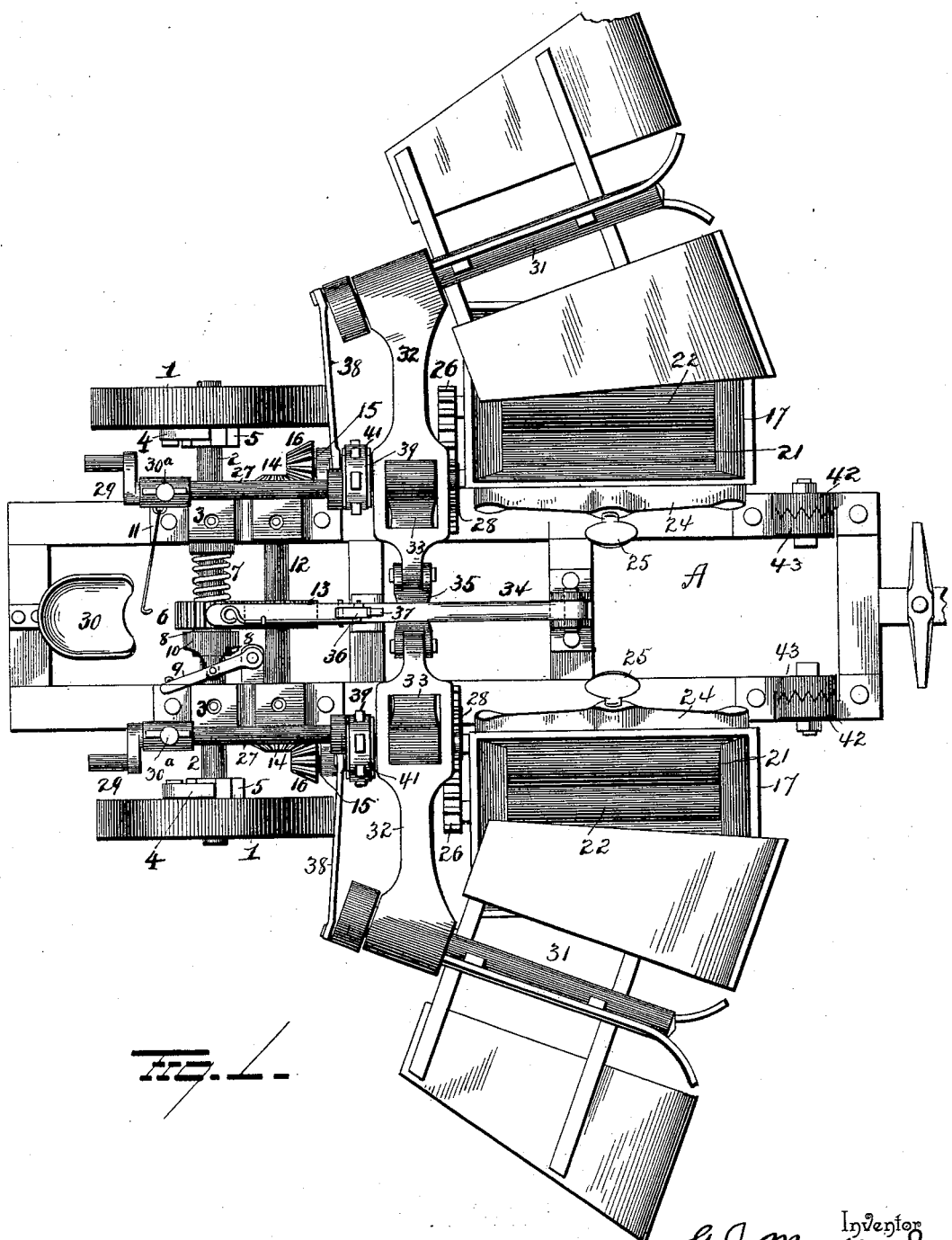
Figure 5:
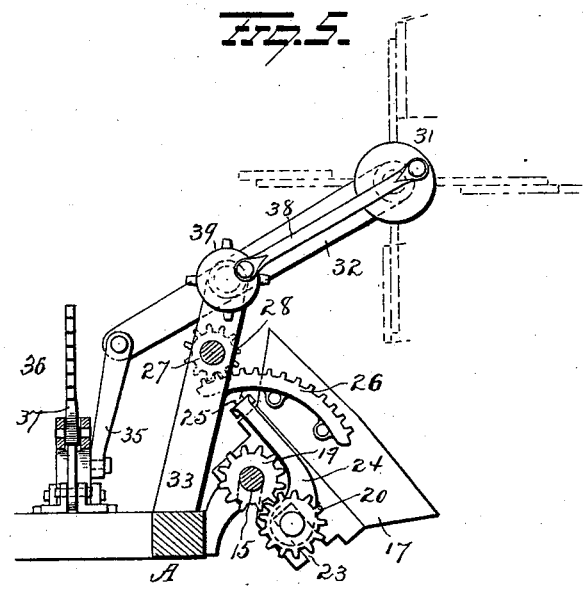
Figure 3:
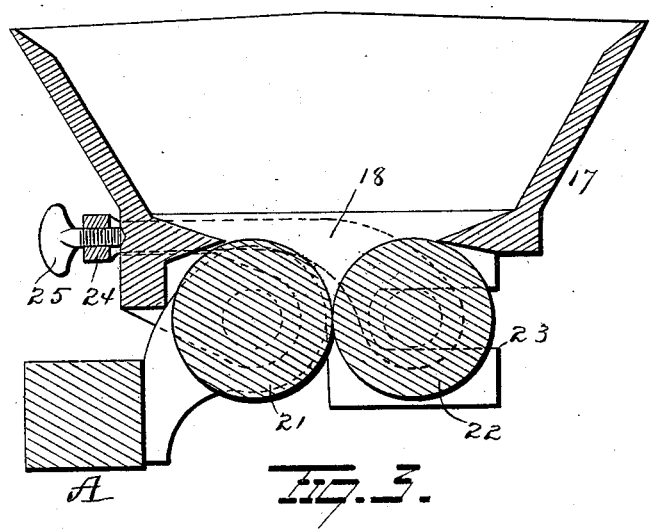

In the accompanying drawings, Figure 1 is a plan view. Fig. 2 is a view in side elevation. Fig. 3 is a section through one of the hoppers, and Figs. 4 and 5 are detail views.

A represents the frame of the machine, and 1 1 are the wheels on which the machine travels. A main shaft 2 is revolubly supported in bearings 3 3 on the frame, and the wheels 1 1 are locked to the shaft by means of spring-dogs 4 4 on the wheels, which are made to engage the teeth of ratchet-toothed wheels 5 5 on the shaft. This shaft 2 also has a gear-wheel 6, constructed to slide thereon, and a spring 7 retains this gear-wheel in its normal position or in engagement with the clutch-section 8, secured upon the shaft. A lever 9, pivoted to the frame, has a shipper 10 pivotally connected with it. This shipper is employed to shift the gear-wheel to one side and unclutch it from the shaft, and a hook 11 is pivoted in position to fasten this lever. Parallel with this main shaft 2 is a secondary one 12, which has a gear-wheel 13 keyed thereon in position to receive motion from wheel 6. This secondary shaft also is provided with two bevel-pinions 14 14, one of which is located on each end.

A pair of shafts 15 15 extend longitudinally of the machine, one at either side of its longitudinal center. These two shafts 15 15 are driven through bevel-pinions 16 16 on their rear ends, which intermesh with bevel-pinions 14 14. On these shafts 15 15 are mounted hoppers 17 17. These hoppers have open bottoms 18 18, and a pair of rollers 21 22 extend longitudinally of these hoppers immediately below the open bottom, one roller, 21, being secured on each shaft 15, and the other rollers, 22 22, receiving their motion therefrom through gear-wheels 19 and 20, located on these two shafts, respectively.

As a means for taking up the wear the rollers 22 22 are supported in elongated boxes 23 23, and bails 24 24, connected with the axles of these rollers, are provided with some means of adjustment, as thumb-screws 25, for changing their position and setting them at the required adjustment to take up wear. The hoppers likewise are capable of adjustment whereby to tilt them to the position of the plants operated upon. On these hoppers the segments 26 26 are secured, and a pair of shafts 27 27 are provided with pinions 28 28, which operate in connection with these segments to tilt the hoppers when the driver desires to adjust them. On the rear ends of these shafts the cranks 29 29 are stationed in easy reach of the driver, who sits upon seat 30. These shafts may be locked by the set-screws 30$^a$.

A pair of fans or sweeps 31 31 are revolubly supported in the outer ends of arms 32 32. These arms are pivoted to standards 33 33, and a hand-lever 34, pivoted to the frame of the machine, is connected to these arms by links 35 35, and the lever is locked to a pivoted toothed bar 36 by means of a latch 37.

The blades of the fans or sweeps preferably taper slightly from the forward end rearward and their forward or larger ends are bent or curved to one side, the object of this construction being to facilitate the removal of the insects from the plants. These fans or sweeps are revolved by pitmen 38 38, which extend from sprocket-wheels 39 39 on the pins which connect the arms 32 to the standards 33, and these sprocket-wheels derive their motion from others on shafts 15 15, through sprocket-chains 41 41, extending around them.

The machine is raised and lowered by the adjustment 42 42 at the rear end of the tongue or pole, this being effected by the bolts passed through the serrated sections 43 43.

The machine may of course be made for one or two draft-animals. In any event it is driven between rows of plants, and as it travels the fans or sweeps brush inward upon the tops of the plants, gently bending them over the hoppers and shaking the insects into the hopper. The rollers, revolving, crush the insects between them, whereupon they drop or are scraped from the rollers. For different heights of plants the sweeps or fans are raised or lowered by means of lever 34. The hoppers also may be tilted as occasion may require. Also, the entire forward end of the machine may be raised or lowered to regulate its position relative to the height of the plants.

It is evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a frame, of a pair of hoppers, a roller journaled in each hopper and each hopper pivotally supported on a roller.

2. The combination with a frame of a pivoted hopper, a pair of rollers, one journaled in the frame and the other in the hopper, the two lying side by side and the hopper mounted on the axle of one, a bail connected with the roller supported in the hopper, and means for adjusting this roller laterally to take up wear.

3. The combination with a frame, of a hopper pivoted thereto, said hopper having a segment thereon, a shaft having a pinion thereon which meshes with the segment, and a crank on the shaft for turning the latter and setting the inclination of the hopper.

4. The combination with a frame, of pivoted arms, sweeps or fans revolubly supported in the arms, the blades of the sweeps or fans tapering and bent laterally at one end.

5. The combination with a frame, arms pivoted thereto, and sweeps or fans revolubly supported in the arms, of a hand-lever, links connecting said lever to the arms, and a pivoted toothed bar to which the hand-lever is locked when the fans or sweeps are set in position.

6. The combination with a frame, hoppers and rollers turning in the bottom of the hoppers, of sweeps or fans, a revolubly-supported sprocket-wheel, a pitman extending therefrom to the fan or sweep, a sprocket-wheel at the roller-shaft, a chain extending around these sprocket-wheels, and means for driving the roller-shafts.

In testimony whereof I have signed this specification in the presence of two subscribing witnesses.

GEORGE J. MOELLER, Jr.

Witnesses:
C. S. DRURY,
G. F. DOWNING.